United States Patent
Parrein et al.

(10) Patent No.: US 8,153,979 B2
(45) Date of Patent: Apr. 10, 2012

(54) INTERFERENCE SPECTROSCOPIC ANALYSIS DEVICE

(75) Inventors: Pascale Parrein, Fontaine (FR); Pierre Gidon, Echirolles (FR)

(73) Assignee: Commissariat a l'Energie Atomique, Paris (FR)

( * ) Notice: Subject to any disclaimer, the term of this patent is extended or adjusted under 35 U.S.C. 154(b) by 620 days.

(21) Appl. No.: 12/328,894

(22) Filed: Dec. 5, 2008

(65) Prior Publication Data

US 2009/0147263 A1 Jun. 11, 2009

(30) Foreign Application Priority Data

Dec. 11, 2007 (FR) ...................................... 07 08621

(51) Int. Cl.
*G01J 5/02* (2006.01)
(52) U.S. Cl. ............... 250/339.07; 250/339.01
(58) Field of Classification Search ............ 250/339.01, 250/339.07
See application file for complete search history.

(56) References Cited

U.S. PATENT DOCUMENTS

| | | | | |
|---|---|---|---|---|
| 5,185,648 A * | 2/1993 | Baker et al. | ............... | 257/189 |
| 5,583,338 A * | 12/1996 | Goodwin | ............... | 250/338.4 |
| 5,781,316 A * | 7/1998 | Strahl et al. | ............... | 359/3 |
| 6,465,860 B2 | 10/2002 | Shigenaka et al. | | |
| 7,352,043 B2 * | 4/2008 | Gidon | ............... | 257/440 |
| 2006/0043517 A1 * | 3/2006 | Sasaki et al. | ............... | 257/458 |

FOREIGN PATENT DOCUMENTS

FR 2879287 A1 6/2006
WO 2006064134 A1 6/2006

OTHER PUBLICATIONS

Bhalotra S R et al: "Silicon-Based Micro-Fourier Spectrometer"; IEEE Transactions on Electron Devices, IEEE Service Center, Pisacataway, NJ, US, vol. 52, No. 3, (Mar. 1, 2005), pp. 419-426, XP011127438; ISSN: 0018-9383.
Helen L Kung et al: "Standing-Wave Transform Spectrometer Based on Integrated MEMS Mirror and Thin-Film Photodectector"; IEEE Journal of Selected Topics in Quantum Electronics, IEEE Service Center, Piscataway, NJ, US, vol. 8, No. 1, (Jan. 1, 2002), XP011062022; ISSN: 1077-260X.
Stiebig H et al: "Interferometric Sensors for Spectral Imaging"; Sensors and Actuators A, Elsevier Sequioia S.A., Lausanne, CH, vol. 120, No. 1, (Apr. 29, 2005), pp. 110-114, XP004856058; ISSN: 0924-4247.

* cited by examiner

*Primary Examiner* — David Porta
*Assistant Examiner* — Mindy Vu
(74) *Attorney, Agent, or Firm* — Lowe Hauptman Ham & Berner, LLP

(57) ABSTRACT

A device for interference spectroscopic analysis of radiation is of the interference type. The device includes at least a first reflecting layer onto which is deposited a multilayer of alternately transparent and photo-absorbing films. Each photo-absorbing layer is connected to an electronic detection unit supplying a primary electronic signal. The device also includes an electronic analyzing unit for analyzing the primary signals and configured in such a manner as to determine the spectral distribution of the original radiation.

17 Claims, 4 Drawing Sheets

INTERFERENCE SPECTROSCOPIC ANALYSIS DEVICE

RELATED APPLICATION

The present application is based on, and claims priority from, French Application Number 07 08621, filed on Dec. 11, 2007, the disclosure of which is hereby incorporated by reference herein in its entirety.

FIELD OF THE INVENTION

The field of the invention relates to that of spectroscopic analysis devices allowing the spectral analysis of radiation.

BACKGROUND OF THE INVENTION

In order to analyze a spectrum of light, spectroscopic devices are used. The scientific, technical and industrial applications are numerous. The testing and verification of materials, the detection of chemical or biological species, etc. may be mentioned. In order to carrying out a spectroscopic analysis, there exist two main types of analysis systems. The first systems are based on chromatic dispersion of light. The light to be analyzed is decomposed by a dispersion system (dichroic plates, prisms, diffraction gratings, etc.) and sent onto a certain number of sensors, each sensor being dedicated to a given spectral band. The second systems operate by interferometry. The light to be analyzed passes through an interferometer (Fizeau, Michelson, etc.). The interferogram produced by the interferometer allows the spectral distribution of the light to be recovered by Fourier analysis.

The most common detection comprises only three detectors working within three different spectral bands but with some overlap. Information, referred to as calorimetric information, is thus recovered allowing the 'color' of the light to be determined. This method is universally applied to the detection and to the formation of colored images insofar as it is possible to integrate a large number of calorimetric sensors. Of course, this information, sufficient for determining the color, is not sufficiently precise for determining even approximately the spectral distribution. Thus, two very different spectra can have the same color.

Furthermore, there exist multispectral detection systems allowing, even rudimentary, spectral information to be obtained with a structure that is sufficiently simple and of limited size in order to be compatible with a matrix arrangement and parallel operation allowing imaging applications. Several approaches have been proposed. Thus, the U.S. Pat. No. 6,465,860 describes a microelectronics device composed of successive layers of semiconductor materials having different absorption spectra, each absorbing layer being separated from the following one by an insulating layer. The fabrication of this type of device is necessarily complex in the sense that each absorbing layer has to have an absorption different from that of other layers and has to be perfectly calibrated.

The patent FR 2 879 287 proposes a second approach. The device described in this patent is a spectroscopic detector comprising a single-mode waveguide one of the faces of which comprises a mirror. The light to be analyzed enters via the opposing face, and is reflected on the mirror thus creating a stationary wave inside the waveguide by the Lippmann effect. Indeed, when an incident wave is reflected on a mirror, it interferes with itself. The interferogram obtained in the structure is representative of the spectral distribution present in the incident wave. The evanescent waves created by this stationary wave are picked up by local detectors placed at the periphery of the waveguide. The analysis of the signals coming from these detectors allows the spectrum of the light to be recovered. It is clear that this principle only works well in the case of a single-mode waveguide. However, the implementation of systems for detection of evanescent waves at the periphery of a single-mode waveguide whose dimensions are less than the interfringe distance equal to $\lambda/2n$, $\lambda$ being the wavelength of the incident wave and n being the optical index of the material, poses considerable technological problems when the wavelengths become optical wavelengths.

SUMMARY OF THE INVENTION

The spectroscopic analysis device according to the invention does not exhibit the limitations of the device of the patent FR 2 879 287. The principle of the device is also based on the existence of a stationary wave present on a mirror. In order to sense this interferogram, the device according to the invention essentially comprises a multilayer of thin films, alternately photodetecting and transparent, deposited on the mirror. The mirror creates the interferogram within the multilayer structure. The photodetecting layers allow local detection of this stationary wave. This is thus a simpler system, with no waveguide and perfectly adapted to a matrix application, and the technical fabrication process can be carried out by the conventional techniques used in microelectronics.

More precisely, the subject of the invention is a device for interference spectroscopic analysis of radiation, characterized in that the device comprises at least a first reflecting layer onto which is deposited a multilayer of thin films being alternately transparent and photo-absorbing.

Advantageously, the device comprises at least a second reflecting layer onto which a second multilayer of thin films is deposited being alternately transparent and photo-absorbing, the structure of the second multilayer being different from that of the first multilayer, the two multilayers being disposed side by side.

Advantageously, at least the thickness of the first layer of the first multilayer disposed immediately on top of the first reflecting layer is different from the thickness of the first layer of the second multilayer disposed immediately on top of the second reflecting layer.

Preferably, the thickness of each of the photo-absorbing layers is less than or equal to around 10% of the mean wavelength of the radiation and the thickness of a transparent layer is less than or equal to around 25% of the mean wavelength of the radiation divided by the optical index of said transparent layer.

Advantageously, the device comprises opto-mechanical means allowing the distance between the reflecting layer and the first detection layer to be modified.

Preferably, the transparent layers are ITO and the photo-absorbing layers are amorphous silicon or the transparent layers are CdTe and the photo-absorbing layers are HgCdTe.

Advantageously, each photo-absorbing layer is connected to electronic detection means supplying a primary electronic signal and the device comprising means for analyzing a set of primary signals coming from the same multilayer and configured in such a manner as to determine the spectral distribution of the light signal. The determination of the spectral distribution of the radiation is carried out by the solution of an inverse problem, in other words by the comparison of a set of primary signals with sets of reference signals corresponding to known spectra.

Another subject of the invention is a spectroscopic imager, comprising a plurality of devices having at least one of the preceding features and organized in a matrix configuration.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

The present invention is illustrated by way of example, and not by limitation, in the figures of the accompanying drawings, wherein elements having the same reference numeral designations represent like elements throughout and wherein.

Figure 1:
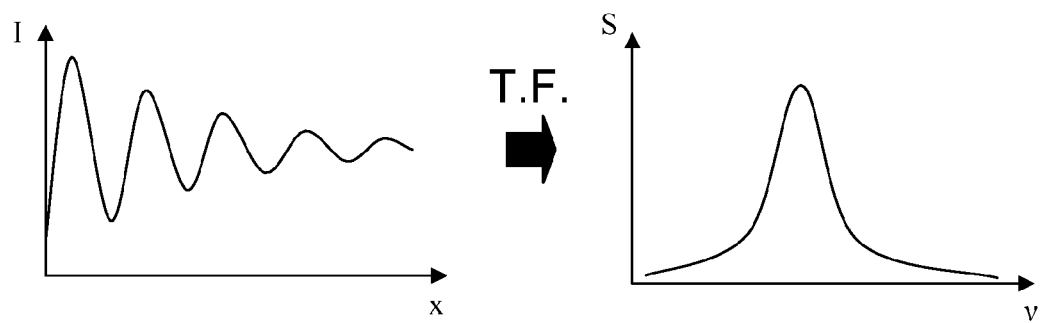
FIG. 1 shows the optical Lippmann effect.

FIG. 1 comprises two views showing the Lippman effect. The first view at the left in FIG. 1 shows the profile of the spatial distribution versus depth in the structure, along an axis x perpendicular to the mirror M, of the intensity of the field of the stationary wave in a homogeneous medium. The origin of the axis is taken on the mirror. This wave is the interference of the incident wave with the wave reflected on a mirror (Lippman effect). The modulation period of this interferogram is representative of the central wavelength of the incident wave and the width of the interferogram is proportional to the coherence length of the incident wave and is inversely proportional to the spectral width of the spectrum of the incident wave. The second view shows the spectral distribution S as a function of the frequency v calculated from the interferogram. This calculation can be carried out, for example, by performing a Fourier transform. The Lippman effect is therefore particularly simple and elegant for obtaining information on the spectrum of radiation, as long as the characteristics of the interferogram can be measured.

Figure 2:
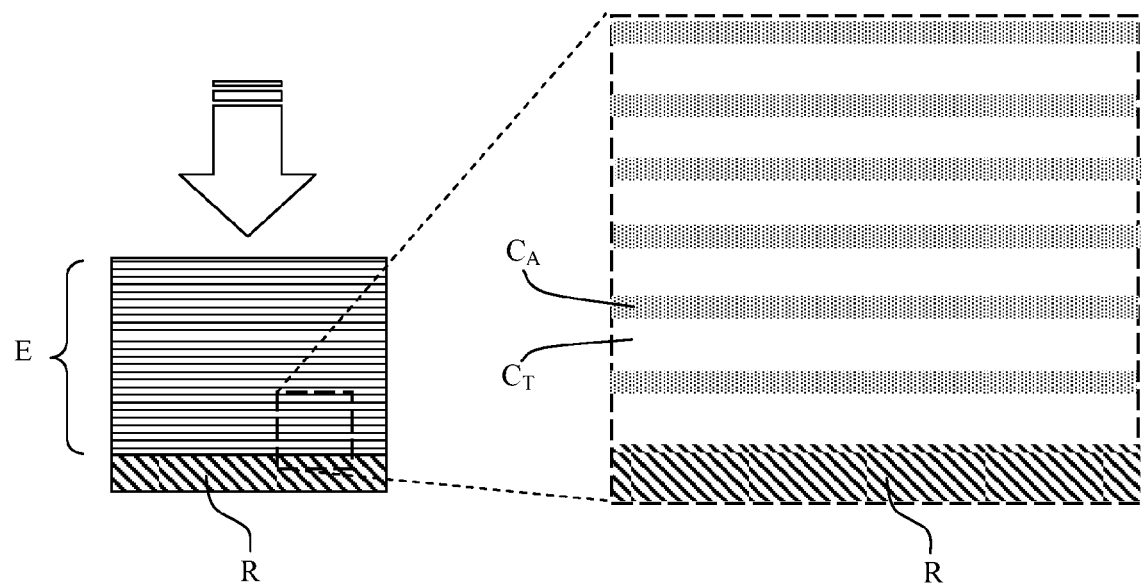
FIG. 2 shows a device structure according to the invention.

The spectroscopic analysis device of the invention is based on the generation of a stationary wave produced by radiation reflected by a mirror. The heart of the invention is the presence, within the interference region, of photo-absorbing layers allowing the intensity of the interferogram at the position of each layer to be determined. By way of example, one structure of a device according to the invention is shown in FIG. 2. This structure essentially comprises:

a first reflecting layer R onto which is deposited a multilayer E of thin films C alternately transparent $C_T$ and photo-absorbing $C_A$. In FIG. 2, the absorbing layers $C_A$ comprise a dotted pattern.

The dimensions in thickness of the structure must be such that, for a source focused inside the component, a plane wavefront propagates within it. The dimensions are of the order of the Rayleigh distance.

It is clear that the structure must be adapted to the spectrum of the radiation to be analyzed. The optical and geometrical proprieties of the layers will determine the spectral detection range of the structure.

If the signal has a central wavelength $\lambda_C$ and a spectral width $\Delta\lambda$, it is shown that the coherence length $L_C$ of the signal is approximately equal to $$\frac{\lambda_C^2}{\Delta\lambda},$$

that the interference fringes forming the interferogram will have a pitch p equal to $$\frac{\lambda_C}{2n}$$

and that the interferogram has a width $I_C$ equal to $$\frac{L_C}{2n},$$

n being the optical index of the transparent thin films.

It is therefore chosen for the thickness of the transparent thin films to be smaller than that of the fringes. A good criterion is that the thickness of the transparent layers must not exceed half the pitch p of the fringes in order to meet the Nyquist criterion. Typically, for applications in the visible, the transparent layers have a thickness of a few tens of nanometers and, more generally, the thickness must be equal to 25% of the mean wavelength divided by the optical index n of the transparent layer.

A number of layers must also be chosen that is sufficient to cover the width of the interferogram.

The absorbing thin films used for the detection must have certain properties. The total absorption of these layers must be sufficiently low so that the optical signal reflected by the structure is still intense enough for there to be measurable interference effects. The absorption coefficient of these layers must be sufficiently constant over the entire spectrum of the light signal.

The thickness of the absorbing layers must be
  small enough so as to be considered as virtually point-like with respect to pitch of the fringes;
  large enough to allow the detection of a photoelectric signal.

Generally speaking, for applications in the visible or the near infra-red, the thickness of the absorbing layers must be in the range between 5 and 12 nanometers and their number must be in the range between five and ten.

It is also advantageous, where there is a prior knowledge of the expected spectrum, to position the absorbing layers at the locations of the intensity maxima of the interferogram.

Figure 3:
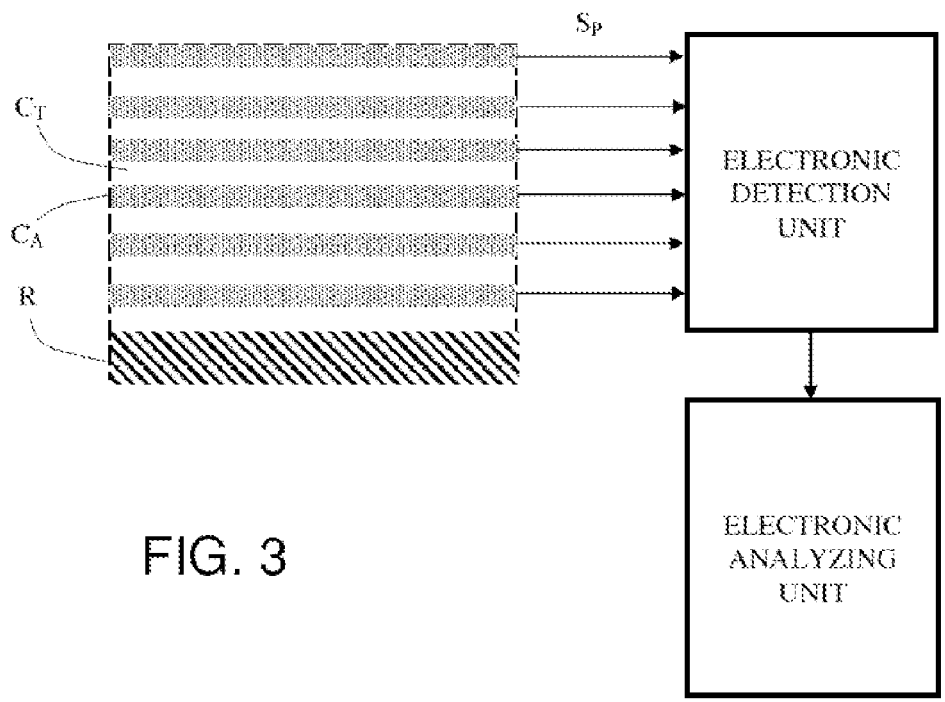
FIG. 3 shows the extraction of the primary signals.

In order to form the interferogram, the primary signals $S_P$ coming from the photo-absorbing layers must be acquired as indicated in FIG. 3. The location of the electrical contacts depends on the electrical properties of the absorbing layers. If the carriers in the absorbing layer are quickly recombined, the contacts must be made above and below the layer: the transparent material must be conducting and act as an electrode. If the carriers are not recombined quickly, the electrical contact may be made laterally: the transparent layer must then be insulating. In this case, the conducting material can be any material.

Figure 4:
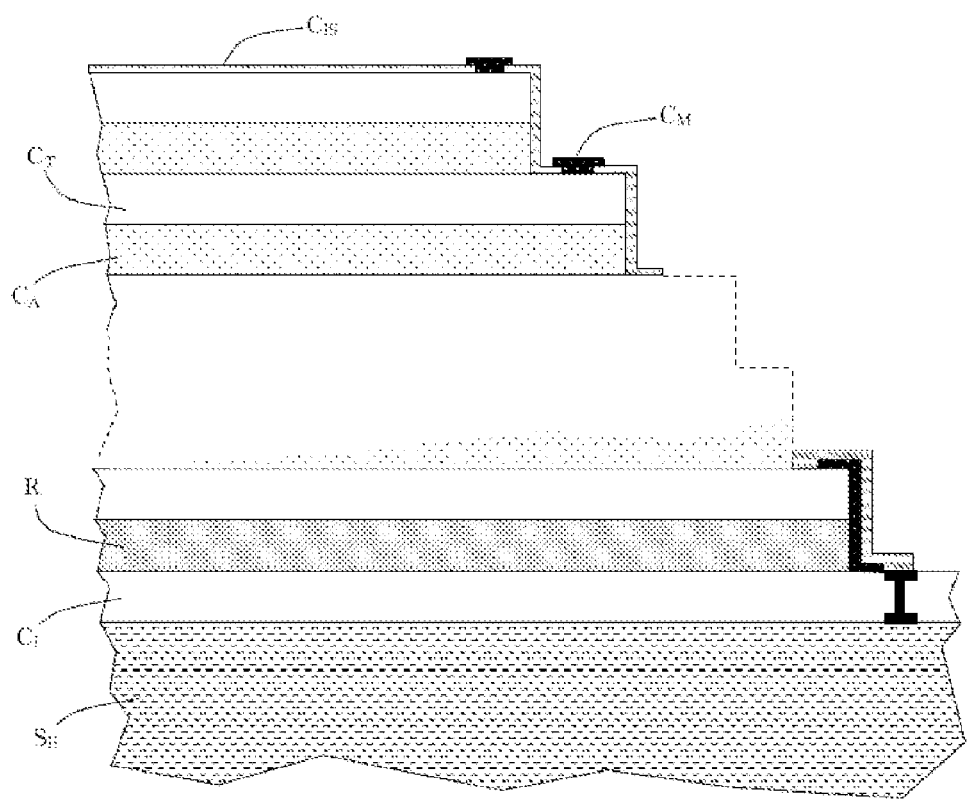
FIG. 4 shows an example of technological embodiment of the electronic structure of a device according to the invention.

By way of example, FIG. 4 shows a cross-sectional view of an arrangement with rapid recombination. The analysis structure essentially comprises:
- a multilayer of alternately transparent $C_T$ and photo-absorbing $C_A$ thin films. In FIG. 4, the absorbing layers comprise a dotted pattern. The transparent layers are, for example, Indium oxide or ITO and the absorbing layers are amorphous silicon;
- a reflecting layer R which may be chrome, aluminum or gold disposed under the multilayer of thin films;
- a multilayer of interconnection layers $C_I$ situated under the reflecting layer;
- a substrate $S_E$ comprising amplification means, such as for example transistors of the CMOS type;
- metal connections $C_M$ arranged in columns, each connection being connected, on the one hand, to an absorption layer and, on the other, to the interconnection layer. These connections are formed on at least one of the edges of the structure as is shown in FIG. 4. They are displaced with respect to the cross-section plane. An insulating layer $C_{IS}$ covers the edges of the column of contacts in order to avoid exchanges with the deeper layers.

The absorption layer can be simple, uniform and operate in photo-resistance mode. It may be more complex and operate in photodiode mode. For example, it can then comprise metal junctions between doped regions.

The materials of this analysis structure are more particularly dedicated to the detection of optical radiation situated in the visible. For applications in the near infra-red, transparent layers of CdTe and photo-absorbing layers of HgCdTe may for example be used. These materials will be understood to belong to the family $Cd_xHg_{1-x}Te$ with x in the range between 0 and 1. In this case, the fabrication process comprises steps for the growth of the HgCdTe layers on the CdTe layers. The reflecting surface is obtained by deposition on the final structure turned over.

Figure 5:
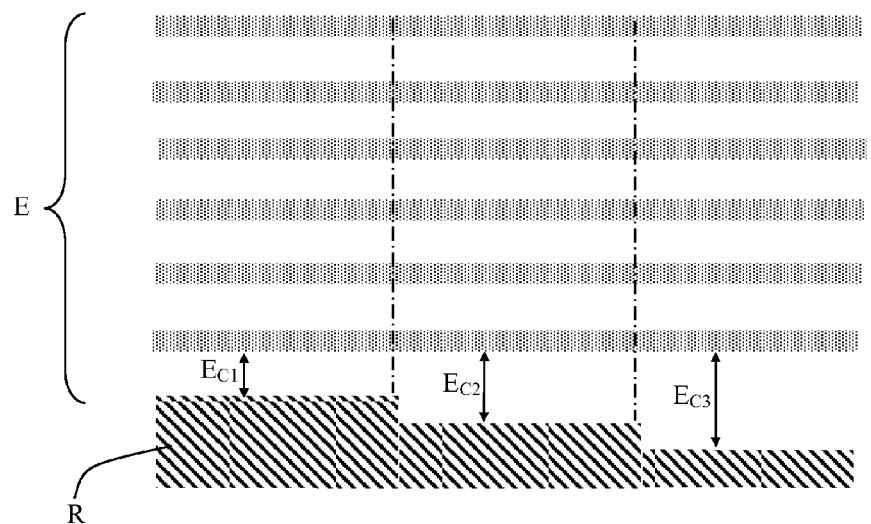
FIG. 5 shows a particular arrangement comprising several structures according to the invention disposed in parallel.

As has been seen, it is not necessarily easy to increase the number of measurement points by multiplying the number of absorbing layers owing to the overall absorption. Accordingly, if it is desired to increase the number of measurement points, several structures may be disposed side by side comprising different multilayers. So as to facilitate fabrication, it is advantageous to only modify one layer from one multilayer to the other, as indicated in FIG. 5, where the thickness $E_{C1}$ of the first layer of the first multilayer disposed immediately on top of the first reflecting layer is different from the thickness of the first layer $E_{C2}$ of the second multilayer disposed immediately on top of the second reflecting layer R.

Figure 7:
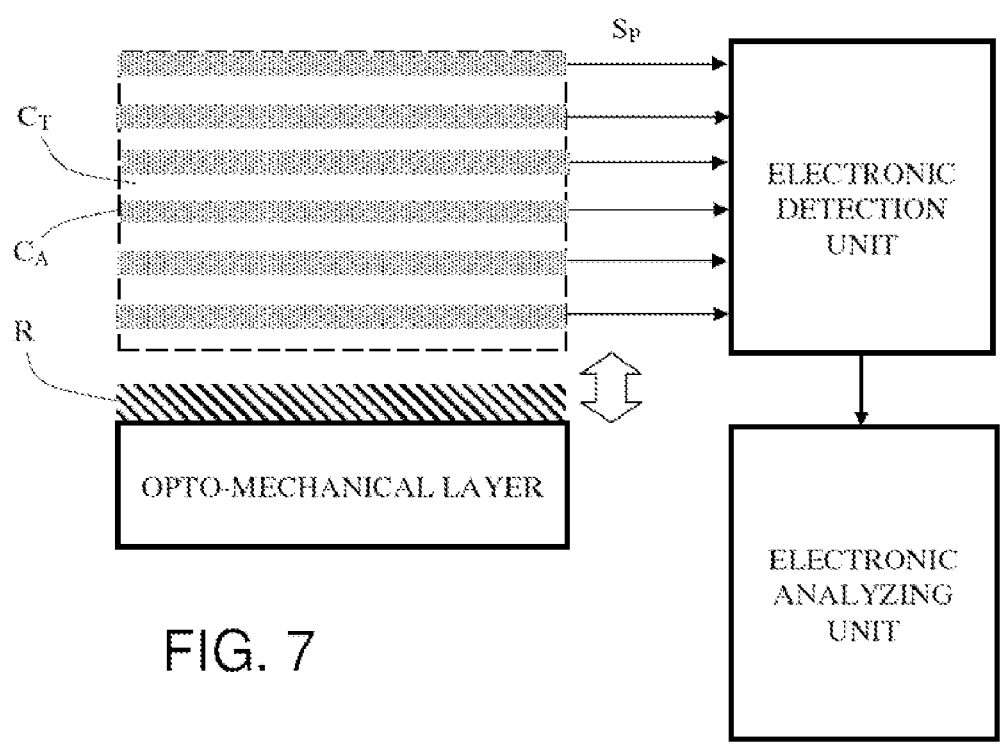
FIG. 7 shows another example of technological embodiment of the electronic structure of a device according to the invention.

As shown in FIG. 7, it may also be envisioned to provide an opto-mechanical layer allowing the distance between the reflecting layer and the first detection layer to be varied.

Figure 6:
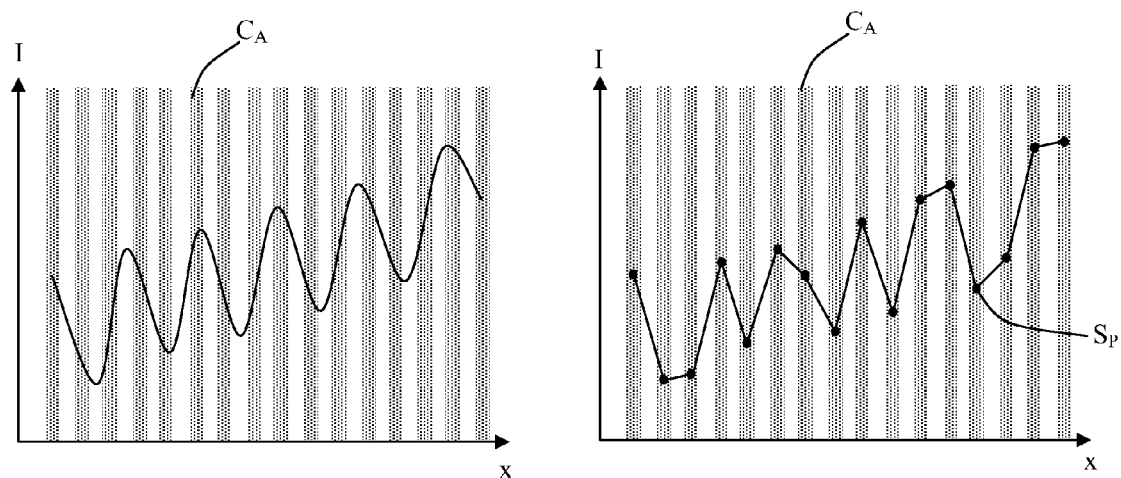
FIG. 6 shows the full set of the primary signals representative of the Lippmann interferogram.

As indicated on the right-hand curve in FIG. 6, the set of the primary signals $S_P$ coming from the photo-absorbing layers is representative of the initial interferogram due to the stationary waves of the light signal shown on the left-hand view in FIG. 6.

In order to determine the spectral distribution based on the knowledge of the primary signals, several approaches are possible. A Fourier transform may be performed on the reconstituted interferogram. However, the number, necessarily limited, of points available and the deformations of the signal due to the multiple reflections on the various layers does not allow simply the Fourier transform to be used.

Preferably, in order to determine the initial spectral distribution of the signal, the solution of an inverse problem is used. If the number of detecting layers is sufficiently high, no prior knowledge is required in order to recover the spectrum. If the number of layers is limited, then this approach requires a certain amount of prior knowledge of the spectrum to be analyzed.

In this approach, the response function f of the sensor is defined. The response of the sensor to a spectrum S is a vector X of dimension N, N being the number of detecting layers. f is a linear function. The response for a spectrum S corresponding to the sum of several individual spectra $s_i$ is the linear combination of the responses $x_i$ for these individual spectra.

The following may be written:

$$f(S)=X$$

and $$f(s_i)=x_i$$

Generally speaking, for the solution of an inverse problem, $f(s_i)=x_i$ for any spectrum $s_i$ and X the response of the sensor to the spectrum S are known.

The spectral information may be recovered by correlation. In a first step, the response for the input spectra and for the source being studied are normalized. This gives:

$$\tilde{x}_i = \frac{x_i}{\|x_i\|} \text{ and } \tilde{X} = \frac{X}{\|X\|}$$

The maximum of the correlation product D between the various vectors is sought, and:

$$D = \tilde{x}_i \cdot \tilde{X} = \sum_{j=1}^{N} \tilde{x}_{ij} \cdot \tilde{X}_j$$

with $x_{ij}$ coordinates of $x_i$ and $X_j$ coordinate of X. When two vectors exactly coincide, the product D equals 1, otherwise the product D is less than 1.

With this approach, the central value of an emission peak may be determined with only five detecting layers whenever there is prior knowledge of its spectral width.

In order to improve the correlation, it is also possible to carry out filtering operations, such as phase filtering, so as to improve the discrimination. Filtered correlation also allows the presence of a known spectral element to be detected by carrying out suitable processing of the signal.

The advantages of this interference spectroscopic analysis device are numerous. It can readily be fabricated by the processes currently used in micro-electronics. Its dimensions are very small. It is a particularly robust device with no fragile or complex optical components. It can easily be adapted to a given wavelength range. A matrix of devices of this type can easily be constructed allowing spectroscopic imaging to be carried out. Finally, it does not require complex analysis means.

The industrial applications are manifold. The following may be mentioned: calibration tools designed to verify the conformity of a spectrum, tools for detecting specific spectra designed for gas or chemical species analysis, spectroscopic imagers designed for scientific applications.

It will be readily seen by one of ordinary skill in the art that the present invention fulfils all of the objects set forth above.

After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

What is claimed is:

1. A device for interference spectroscopic analysis of radiation, comprising
   at least a first reflecting layer;
   a multilayer film including transparent and photo-absorbing layers alternately arranged, at least said first reflecting layer being deposited onto the multilayer film;
   an electronic detection unit, each of photo-absorbing layers being connected to the electronic detection unit for supplying a primary electronic signal; and
   an electronic analyzing unit configured for analyzing a set of primary signals from the multilayer film in such a manner as to determine a spectral distribution of a light signal,
   wherein the photo-absorbing layers have an absorption coefficient which is sufficiently constant over an entire spectrum of the light signal.

2. The device as claimed in claim 1, further comprising at least a second reflecting layer and a second multilayer film including transparent and photo-absorbing layers alternately arranged, at least the second reflecting layer being deposited onto the second multilayer film,
   wherein
   the multilayer film is a first multilayer film and has a structure different from the second multilayer film, and
   the first and second multilayer films are disposed side by side.

3. The device as claimed in claim 2, wherein a thickness of a first layer of the first multilayer film disposed immediately on top of the first reflecting layer is different from a thickness of a first layer of the second multilayer film disposed immediately on top of the second reflecting layer.

4. The device as claimed in claim 3, wherein a thickness of each of the photo-absorbing layers is less than or equal to around 10% of the mean wavelength of the light signal.

5. The device as claimed in claim 3, wherein a thickness of each of the transparent layers is less than or equal to around 25% of the mean wavelength of the radiation divided by the optical index of said transparent layer.

6. The device as claimed in claim 2, wherein a thickness of each of the photo-absorbing layers is less than or equal to around 10% of the mean wavelength of the light signal.

7. The device as claimed in claim 2, wherein a thickness of each of the transparent layers is less than or equal to around 25% of the mean wavelength of the radiation divided by the optical index of said transparent layer.

8. The device as claimed in claim 2, wherein the transparent layers are ITO and the photo-absorbing layers are amorphous silicon.

9. The device as claimed in claim 1, wherein a thickness of each of the photo-absorbing layers is less than or equal to around 10% of the mean wavelength of the light signal.

10. The device as claimed in claim 9, wherein a thickness of each of the transparent layers is less than or equal to around 25% of the mean wavelength of the radiation divided by the optical index of said transparent layer.

11. The device as claimed in claim 1, wherein a thickness of each of the transparent layers is less than or equal to around 25% of the mean wavelength of the radiation divided by an optical index of said transparent layer.

12. The device as claimed in claim 1, further comprising an opto-mechanical layer configured allowing a distance between the reflecting layer and the layer of the multilayer film to be detected first to be varied.

13. The device as claimed in claim 1, wherein the transparent layers are ITO and the photo-absorbing layers are amorphous silicon.

14. The device as claimed in claim 1, wherein the transparent layers are CdTe and the photo-absorbing layers are HgCdTe.

15. The device as claimed in claim 1, wherein the determination of the spectral distribution of the radiation is carried out by the solution of an inverse problem, in other words by the comparison of a set of primary signals with sets of reference signals corresponding to known spectra.

16. A spectroscopic imager, comprising an organized plurality of devices as claimed in claim 1.

17. A device for interference spectroscopic analysis of radiation, comprising
   at least a first reflecting layer and a multilayer film including transparent and photo-absorbing layers alternately arranged, at least said first reflecting layer being deposited onto the multilayer film;
   an electronic detection unit, each of photo-absorbing layers being connected to the electronic detection unit for supplying a primary electronic signal;
   an electronic analyzing unit configured for analyzing a set of primary signals from the multilayer film in such a manner as to determine a spectral distribution of a light signal;
   at least a second reflecting layer and a second multilayer film including transparent and photo-absorbing layers alternately arranged, at least the second reflecting layer being deposited onto the second multilayer film,
   wherein
   the multilayer film is a first multilayer film and has a structure different from the second multilayer film, and
   the first and second multilayer films are disposed side by side.

* * * * *